United States Patent [19]

Rogers

[11] Patent Number: 4,714,934

[45] Date of Patent: Dec. 22, 1987

[54] APPARATUS FOR PRINTING WITH INK JET CHAMBERS UTILIZING A PLURALITY OF ORIFICES

[75] Inventor: Robert L. Rogers, Sandy Hook, Conn.

[73] Assignee: Exxon Research & Engineering Company, Florham Park, N.J.

[21] Appl. No.: 801,925

[22] Filed: Nov. 26, 1985

[51] Int. Cl.⁴ ............................................. G01D 15/16
[52] U.S. Cl. ................................ 346/140 R; 400/126
[58] Field of Search .................. 346/140, 75; 400/126

[56] References Cited

U.S. PATENT DOCUMENTS

| | | | |
|---|---|---|---|
| 3,703,628 | 11/1972 | Philipson, Jr. | 235/61.9 R |
| 3,787,881 | 1/1974 | Duffield | 346/75 |
| 3,974,508 | 8/1976 | Blumenthal | 346/140 |
| 4,131,899 | 12/1978 | Christou | 346/140 |
| 4,396,303 | 8/1983 | Uddgren | 400/103 |
| 4,459,601 | 7/1984 | Hawkins | 346/140 |
| 4,460,905 | 7/1984 | Thomas | 346/140 R |
| 4,485,386 | 11/1984 | Dagna | 346/140 X |
| 4,533,925 | 8/1985 | Tsao et al. | 346/75 |

Primary Examiner—Joseph W. Hartary
Attorney, Agent, or Firm—Woodcock Washburn Kurtz Mackiewicz & Norris

[57] ABSTRACT

An impulse ink jet apparatus capable of printing bar codes comprises a plurality of side-by-side chambers extending along a line slanted with respect to the direction of scanning. Each of the chambers includes a plurality of orifices arranged along a line extending substantially transverse to the scanning direction and means for ejecting a plurality of droplets from the orifices of each chamber.

7 Claims, 9 Drawing Figures

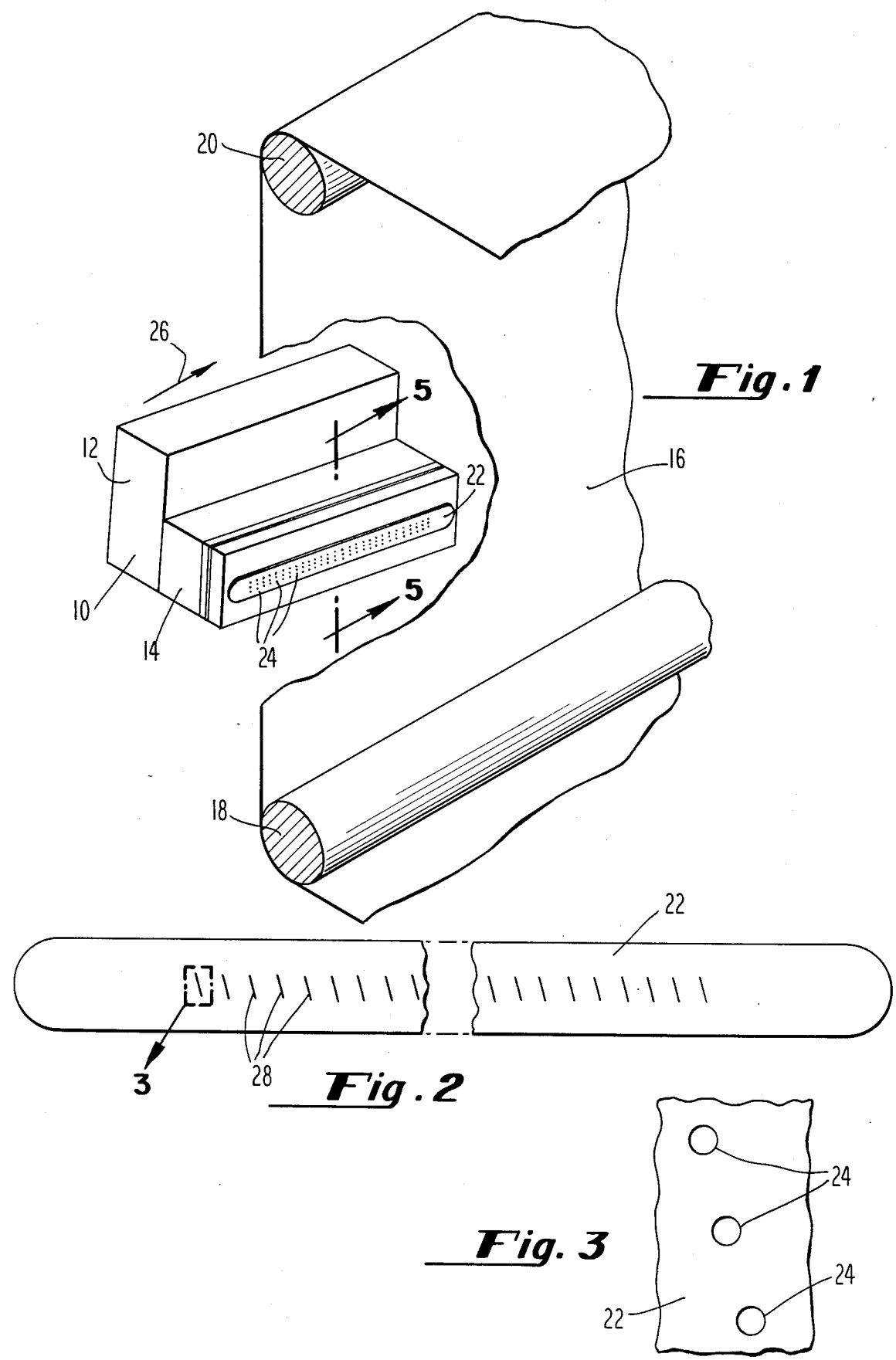

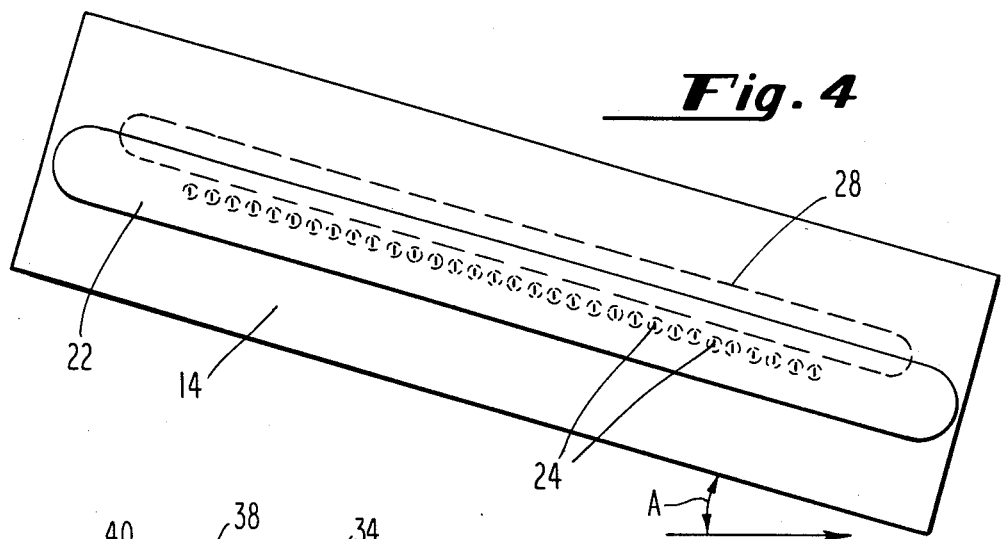
Fig. 4
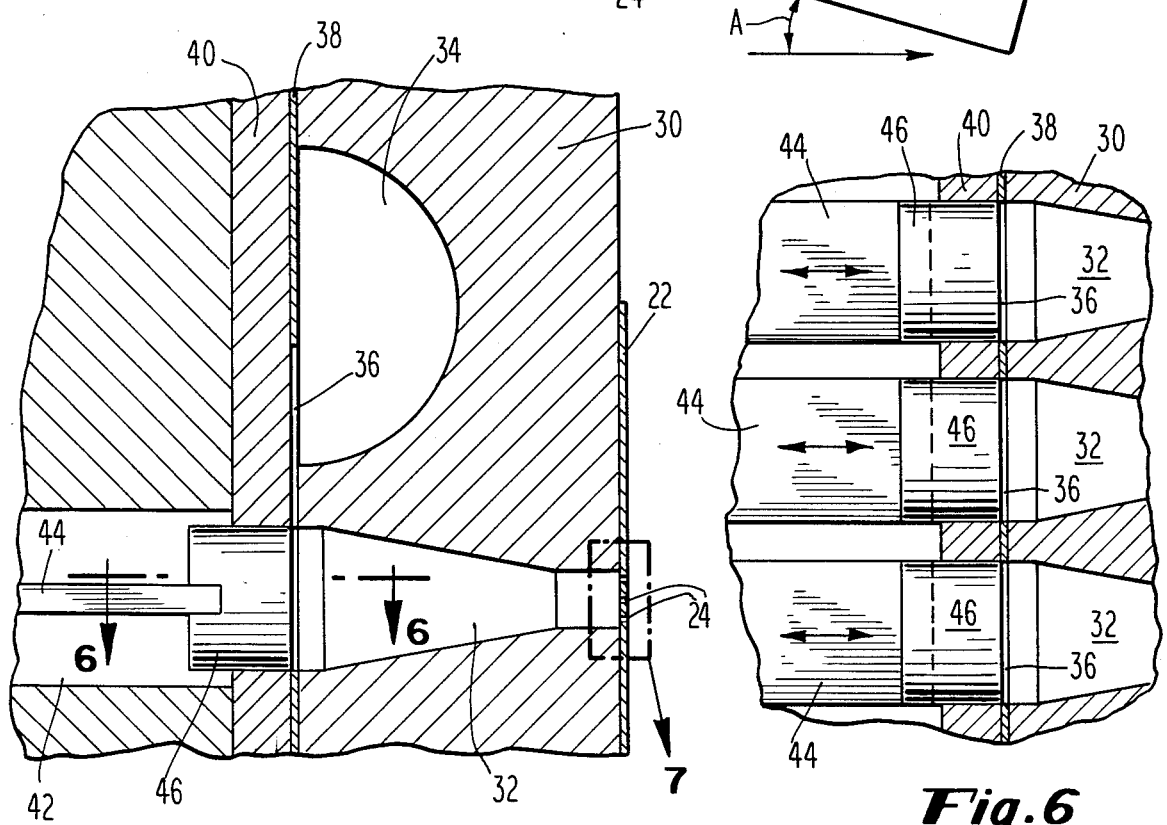
Fig. 5
Fig. 6
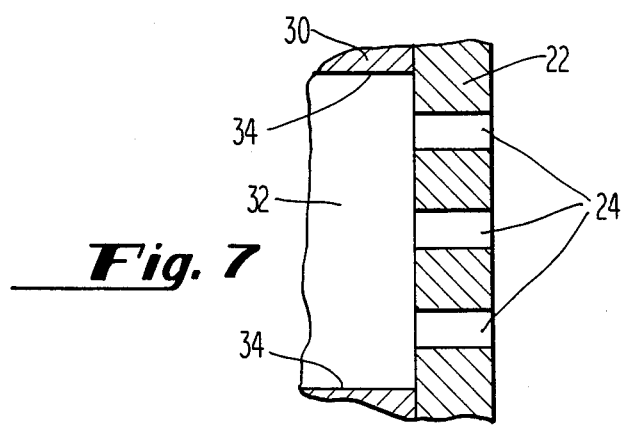
Fig. 7

4,714,934

APPARATUS FOR PRINTING WITH INK JET CHAMBERS UTILIZING A PLURALITY OF ORIFICES

BACKGROUND OF THE INVENTION

This invention relates to impulse or drop-on-demand ink jet printers. This invention also relates to printers which are capable of printing bar codes.

Co-pending application Ser. No. 801,926, filed Nov. 26, 1985, which is assigned to the assignee of this invention describes an impulse or drop-on-demand ink jet comprising an ink chamber having a plurality of ejection orifices where droplets are simultaneously ejected from each of said plurality of orifices by energizing a single transducer associated with the chamber. As disclosed in the aforesaid application, a plurality of such ink jets may be utilized for printing predetermined patterns, including bar codes, while minimizing the number of channels required. In other words, the number of chambers and transducers and associated circuitry and fluidic passageways may be minimized for the above-described arrangement.

The 965 printer which has been marketed by Exxon Office Systems, an affiliate of the assignee of the subject application, employs a plurality of chambers with a single orifice for each chamber and a single transducer for ejected a droplet from the single orifice of each chamber. In that printer, the orifices are slanted or inclined with respect to the scanning direction so as to provide a desired field height while, at the same time, maintaining a desired resolution. Details of the 965 printer are disclosed in application Ser. No. 467,040, filed Feb. 16, 1983, now U.S. Pat. No. 4,567,570, which is assigned to the assignee of this invention.

SUMMARY OF THE INVENTION

It is an object of this invention to provide an impulse or drop-on-demand printer while, at the same time, providing a high degree of resolution and field height.

It is also an object of this invention to provide an impulse or drop-on-demand ink jet printer capable of depositing bar codes.

In accordance with this invention, an impulse ink jet apparatus comprises a plurality of side-by-side chambers extending along a line slanted with respect to the direction of scanning. Each of the chambers includes a plurality of orifices arranged along a line extending substantially transverse to the scanning direction and means for ejecting a plurality of droplets from the orifices of each chamber.

In a preferred embodiment of the invention, the overall field of droplets comprises the field of the plurality of droplets for one chamber multiplied by the number of chambers.

In the preferred embodiment, the chamber line is slanted at an angle with respect to the scanning direction in excess of ten degrees (10°) and preferably in excess of fifteen degrees (15°). Preferably, the number of chambers exceeds the number of orifices per chamber.

In the preferred embodiment, the chambers are substantially circular and the means for ejecting comprises a plurality of transducers, one of the transducers being coupled to each of the chambers. Preferably, the transducers are elongated and adapted to expand and contract along the axis of elongation so as to eject droplets.

BRIEF DESCRIPTION OF THE DRAWINGS

FIG. 1 is a perspective view of the system depicting the invention incorporated in a bar code printer;

FIG. 2 is a plan view of an orifice plate of the system shown in FIG. 1;

FIG. 3 is a fragmentary view of the fragment 3 shown in FIG. 2;

FIG. 4 is a front view of the imaging head for the system shown in FIG. 1;

FIG. 5 is a sectional view taken along line 5—5 of FIG. 1; FIG. 6 is a sectional view of a channel of the system shown in FIGS. 1-5 taken along line 6—6 of FIG. 5;

FIG. 7 is a fragmentary view of the fragment 7 of FIG. 5;

DETAILED DESCRIPTION OF A PREFERRED EMBODIMENT

Figure 8:
FIG. 8 is a bar code in combination with alpha-numeric characters which can be printed with the apparatus shown in FIGS. 1-7.

Referring to FIG. 1, a print head 10 includes a reservoir 12 and an imaging head 14. The print head 10 is juxtaposed to a target in the form of paper 16 which is advanced by means of a transport system, including rollers 18 and 20, in an incremental fashion. As shown in FIG. 1, print head 10 includes an orifice plate 22, including orifices 24. In FIG. 1, the orifices are shown further apart from each other than they are in practice for purposes of illustration.

In accordance with this invention, the orifices 24 actually comprise a plurality of sets of orifices which will be more fully described with reference to FIGS. 2 and 3. The sets of orifices 24 are also vertically displaced as a result of the inclination of the print head 10 with respect to the scanning direction depicted by the arrow 26.

In accordance with this invention, as will be made clear with reference to FIGS. 2 and 3, the orifices 24 are arranged in groups of three (3) and inclined on the orifice plate 22 so as to be substantially vertical when the print head 10 is inclined with respect to the scanning direction 26 as shown in FIG. 1. The hash marks 28 on the orifice plate 22 actually show this angle of inclination. The angle of the orifices 24 in each group with respect to the vertical as shown in FIG. 2 is chosen such that, when the orifice plate 22 is inclined, as shown in FIG. 4, the groups of orifices 24 will be vertical. Moreover, scanning in a direction depicted by the arrow 26 in FIG. 4 will not result in the overlap of any droplets projected from the orifice when the droplets are ejected sequentially so as to form a vertical bar. The angle "A" of inclination for the chamber line (of the orifice plate 22) to achieve this vertical disposition of the orifices 24 exceeds ten degrees (10°) and preferably exceeds fifteen degrees (15°). The particular slope is determined by the number of orifices, the inter-orifice spacing, the inter-chamber spacing and, to a lesser extent, the spacial resolution along the direction of travel. As also shown in FIG. 4, a manifold 28 is provided behind the orifice plate 22 which will now be described in detail with reference to FIG. 5.

As shown in FIG. 5, orifice plate 22 is secured to a chamber plate 30, including a chamber 32 and a manifold 34. Ink within the manifold 34 communicates with the chamber 32 through a restricted passageway 36 provided by a restrictor plate 38. A foot body member 40, located behind the restrictor plate 38, includes an opening 42 which receives an elongated transducer 44 terminated with a foot 46 which is in direct communication with the rear of the chamber 32.

As shown in FIGS. 5 and 6, transducers 44 are elongated and flat. Such transducers are expanded and then contracted along the axis of elongation so as to contract and expand the volume of the transducer 32 through the feet 46 by virtue of the application of a voltage applied across the planar surfaces of the transducers 44.

It will be appreciated that the feet 46 may be secured to the foot member 40 by means of a resilient rubber-like material, such as silicone, which is marketed under the name RTV. The ends of the transducers 44 may be cemented to the feet 46 by means of a suitable adhesive such as, for example, an epoxy.

Referring to FIG. 7, the individual orifices 24 are coupled to the chamber 32, as shown in detail. It will be noted that the orifices 24 closest to the rearwardly extending chamber walls 34 are spaced a distance therefrom equal to at least half the spacing between orifices 24. This is necessary to assure that droplets ejected from the orifices 24 are ejected with substantially uniform velocity.

Figure 9:
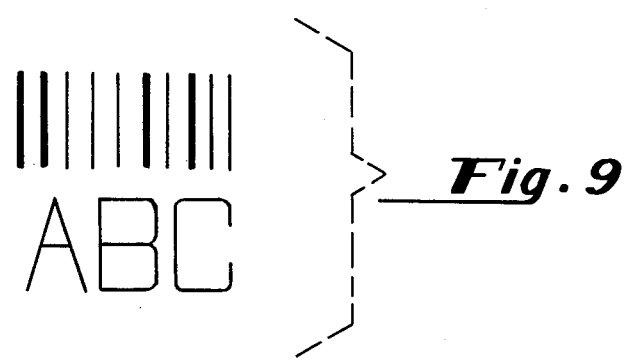
FIG. 9 is another bar code with alpha-numeric characters which can also be printed utilizing the system of FIGS. 1-7.

Referring now to FIGS. 8 and 9, the type of printing achieved from the apparatus shown in FIGS. 1-7 is illustrated. At the lefthandmost extremity in FIG. 8, there is depicted a bar code wherein the width of the bars is modulated so as to produce wide bars 50 and narrow bars 52; also depicted in FIG. 8, are alpha-numeric characters "A", "B" and "C". In accordance with one important aspect of the invention, the number of orifices 24 in each of the chambers 32 is chosen vis-a-vis the number of chambers 24 so as to permit a sufficient degree of vertical and horizontal resolution to achieve both bar code and alpha-numeric printing. In other words, the number of channels or chambers 32 is substantially more than the number of orifices 24 per channel or chamber. As shown in FIGS. 4 and 7, the total number of channels or chambers 32 is thirty-two (32), whereas the total number of orifices 24 per chamber is only three (3).

In FIG. 9, bar coding, as well as alpha-numeric printing, is achieved utilizing the apparatus of FIGS. 1-7. In the case of FIG. 9, bar coding, including variable width bars 54, is located above the alpha-numeric characters. In order to achieve the results shown in FIG. 9, certain channels may be dedicated to alpha-numeric printing while other channels are dedicated to bar coding printing. Here again, the number of orifices per chamber or channel vis-a-vis the number of channels is important to achieve the combination shown in FIG. 9.

In the embodiments of the invention shown and described, a particular combination of orifices and chambers has been chosen to achieve a particular result. In general, bar code printing requires bars from 0.125 inches to one (1) inch high and a minimum width of 0.007 inches, with good control of edges, width and gaps between bars. By utilizing three (3) orifices per channel, and a total of thirty-two (32) channels, the necessary degree of accuracy may be achieved, including sufficient vertical resolution to permit alpha-numeric printing while also permitting bars 0.500 inches high to be printed in a single pass. In this connection, it will be appreciated that each vertical bar resulting from the ejection of droplets from the orifices of a single chamber is only 0.018 inches.

At the same time, other combinations of orifices and chambers may be utilized. For example, it is possible to utilize three (3) to fourteen (14)—preferably three (3) to six (6); most preferably three (3) or four (4)—orifices per channel or chamber. It is also possible to utilize more channels to achieve greater field height with a single pass of the print head 10 as shown in FIG. 1.

It will be appreciated that the width of the bars is controlled by the manner in which the transducers are pulsed. It is also possible to utilize multi-pulsing techniques which have a high degree of control of the width of bars. Such techniques are disclosed in co-pending applications Ser. No. 453,295, filed Dec. 27, 1982, and Ser. No. 600,785, filed Apr. 4, 1984, now abandoned in favor of applications Ser. No. 857,517 filed Apr. 22, 1986 and Ser. No. 600,785 filed Apr. 16, 1984.

The transducers which have been shown and described herein are elongated and expand and contract along the axis of elongation in response to energization of the application of voltage as transverse to the axis of elongation. Details concerning such an ink jet apparatus are set forth in co-pending application Ser. No. 576,582, filed Feb. 3, 1984 now U.S. Pat. No. 4,646,106. As will, of course, be appreciated other transducer configurations and chamber geometries may be utilized to eject droplets from orifices in accordance with this invention.

Various inks may be employed in the method and apparatus of this invention. However, one particulary desirable ink is described in co-pending application Ser. No. 801,015, filed Nov. 22, 1985, assigned to the assignee of this invention. In addition, it is possible to utilize a so-called phase change or hot melt ink such as that disclosed in co-pending application Ser. No. 610,627, filed May 16, 1984, now abandoned in favor of Ser. No. 938,334 filed Dec. 4, 1986 assigned to the assignee of this invention.

Although particular embodiments of the invention have been shown and described and various modifications suggested, it will be appreciated that other embodiments and modifications which fall within the true spirit and scope of the invention as set forth in the appended claims will occur to those of ordinary skill in the art. Such modifications are disclosed, for example, in co-pending applications Ser. No. 801,926, filed Nov. 26, 1985.

I claim:

1. An impulse ink jet apparatus for printing bars in a bar code comprising a plurality of side-by-side chambers extending along a line slanted with respect to the direction of scanning, each of said chambers including a plurality of orifices arrayed along a line extending substantially transverse to the scanning direction and means for ejecting a plurality of droplets from the orifices of each chamber including a plurality of transducers, one of said transducers being coupled to each of said chambers, said plurality of orifices for each of said chambers being arrayed along a line extending to right angles to said scanning direction such that the overall field of droplets ejected from each of said plurality of orifices prints a segment of a bar but does not overlap with the overall field of droplets ejected from each other said plurality of orifices which print a different segment of the bar.

2. The impulse ink jet apparatus of claim 1 wherein the overall field of droplets comprises the field of the plurality of droplets for one chamber multiplied by the number of chambers.

3. The impulse ink jet apparatus of claim 1 wherein said chamber line is slanted at an angle in excess of ten degrees (10°).

4. The impulse ink jet apparatus of claim 1 wherein said chamber line is slanted at a angle in an excess of fifteen degrees (15°).

5. The impulse ink jet apparatus of claim 1 wherein the number of chambers exceeds the number of orifices per chamber.

6. The impulse ink jet apparatus of claim 1 wherein said chambers are sequentially circular in cross-section.

7. The impulse ink jet apparatus of claim 1 wherein each of said transducers is elongated and adapted to expand and to contract along the axis of elongation so a to eject droplets.

* * * * *